F. H. C. COPPUS.
DEVICE FOR USE IN CASTING TURBINES.
APPLICATION FILED OCT. 21, 1913.
1,128,854.
Patented Feb. 16, 1915.
3 SHEETS—SHEET 1.
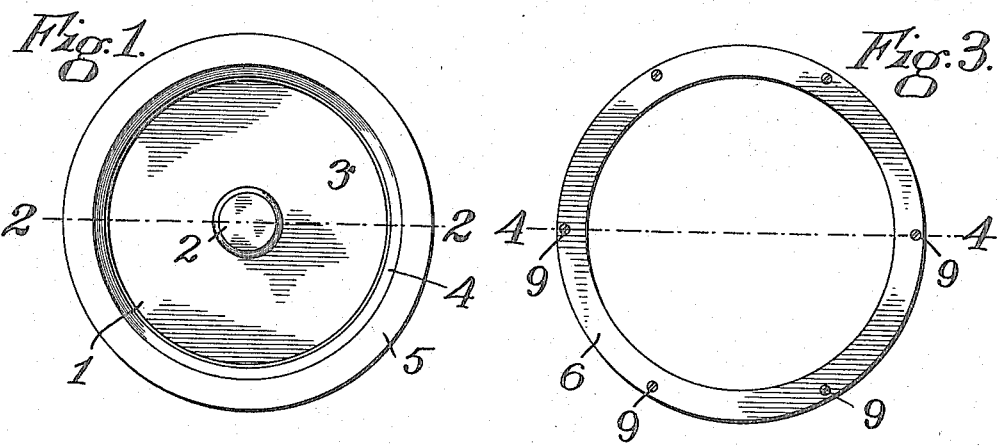
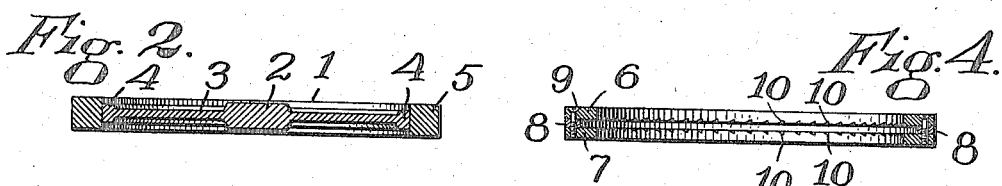
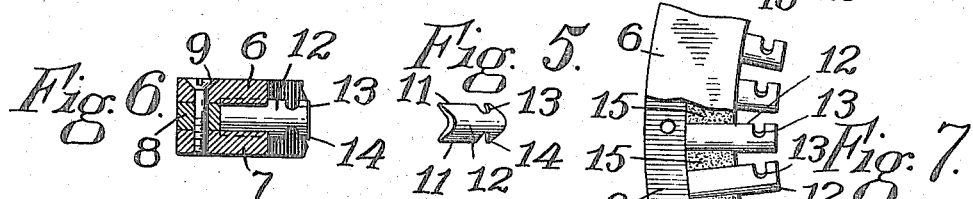
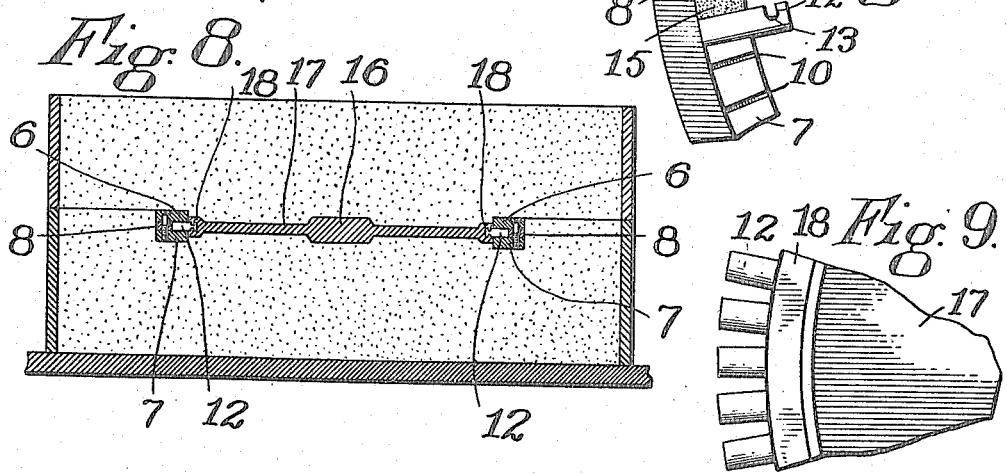
Witnesses
Roy D. Tolman.
Penelope Combarbach.
Inventor
Frans H. C. Coppus
By Rufus B. Fowler
Attorney

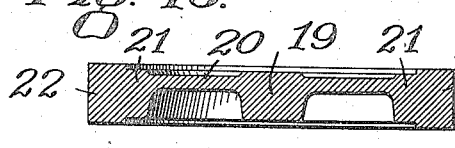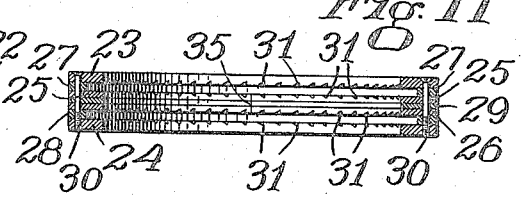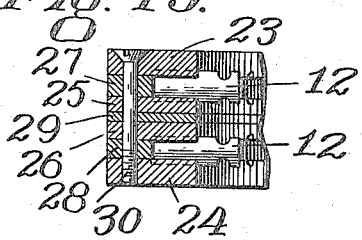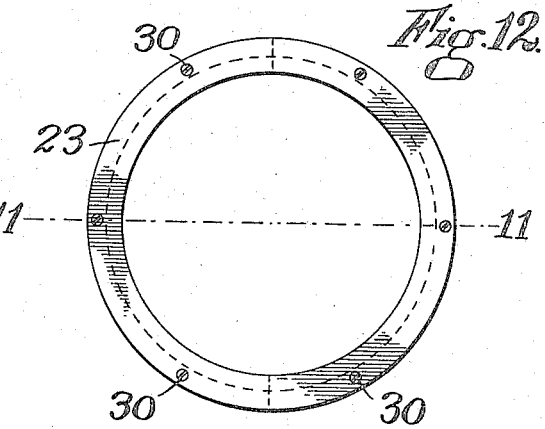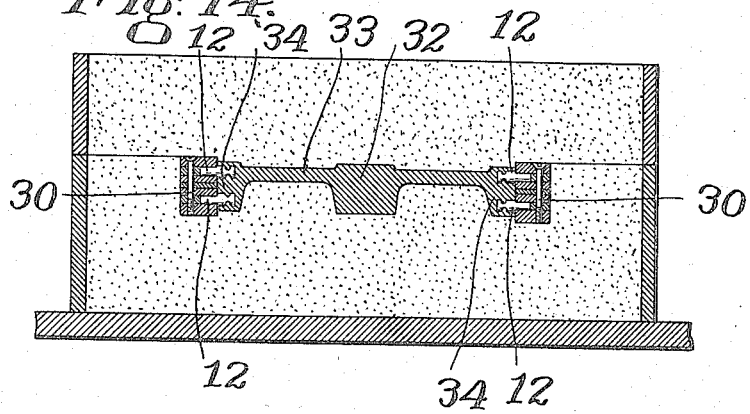

F. H. C. COPPUS.
DEVICE FOR USE IN CASTING TURBINES.
APPLICATION FILED OCT. 21, 1913.
1,128,854.
Patented Feb. 16, 1915.
3 SHEETS—SHEET 3.
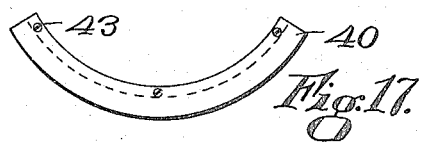
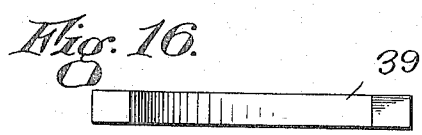
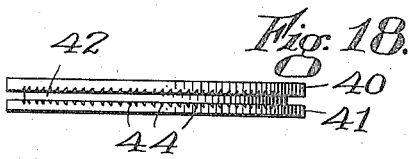
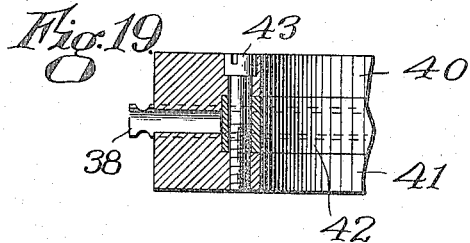
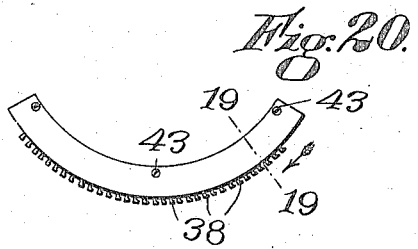
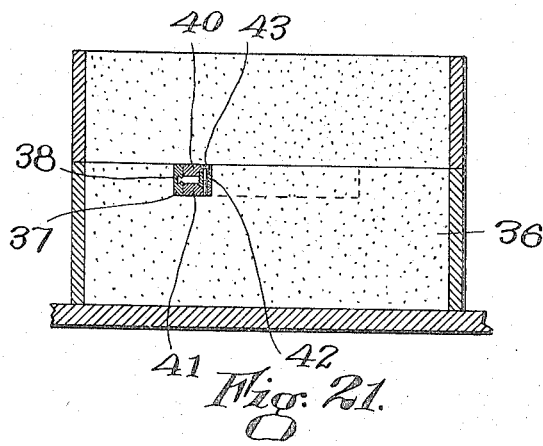
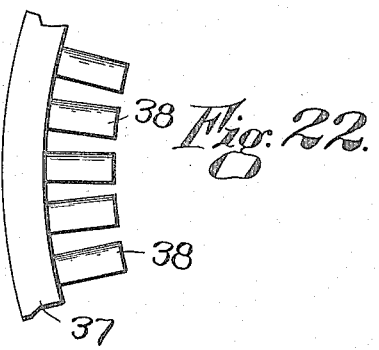
Witnesses.
Roy D. Tolman.
Penelope Comberbach.
Inventor
Frans H. C. Coppus,
By Rufus B. Fowler
Attorney

UNITED STATES PATENT OFFICE.

FRANS H. C. COPPUS, OF WORCESTER, MASSACHUSETTS, ASSIGNOR TO COPPUS ENGINEERING AND EQUIPMENT COMPANY, OF WORCESTER, MASSACHUSETTS, A CORPORATION OF MASSACHUSETTS.

DEVICE FOR USE IN CASTING TURBINES.

1,128,854.   Specification of Letters Patent.   Patented Feb. 16, 1915.

Application filed October 21, 1913. Serial No. 796,518.

*To all whom it may concern:*

Be it known that I, FRANS H. C. COPPUS, a citizen of the United States, residing at Worcester, in the county of Worcester and Commonwealth of Massachusetts, have invented a new and useful Improvement in Devices for Use in Casting Turbines, of which the following, together with the accompanying drawings, is a specification.

My present invention relates to devices for use in casting turbines and resides in means for accurately positioning the blades or buckets for the turbine in the matrix of a sand mold so that molten metal may be poured about the ends of the blades to form the castings which are to support them, the novel features being pointed out in the annexed claims.

Referring to the drawings, Figure 1 is a plan view of the pattern employed in forming the matrix in a sand mold for casting a turbine wheel having one row of blades or buckets; Fig. 2 is a central sectional view of the same on the line 2—2 of Fig. 1; Fig. 3 is a plan view of the positioning plates or rings for holding a single row of blades in the matrix; Fig. 4 is a central sectional view of the same on the line 4—4 of Fig. 3; Fig. 5 is a detached view of one of the turbine blades; Fig. 6 represents a portion of the blade positioning rings upon a larger scale, with one of the blades held therein; Fig. 7 represents in plan view a series of blades held in position, with one of the positioning rings removed; Fig. 8 is a sectional view of the molding flask with a cast turbine wheel contained therein; Fig. 9 represents a portion of the rim of the turbine wheel removed from the flask, showing the projecting blades; Fig. 10 represents the pattern employed in forming the matrix for a turbine wheel having two rows of blades projecting from its periphery; Fig. 11 represents in central sectional view the positioning rings by which the two rows of blades are held, the section being shown on the broken line 11—11 of Fig. 12; Fig. 12 represents a plan view of the positioning rings shown in Fig. 11; Fig. 13 represents a portion of the positioning rings in sectional view, with blades held therein shown on a larger scale; Fig. 14 represents a central section of the sand mold having a turbine wheel with two rows of blades cast therein; Fig. 15 is a plan view of the pattern employed in forming the matrix in a sand mold for casting a support for stationary blades or buckets of a turbine; Fig. 16 is an edge view of the pattern shown in Fig. 15; Fig. 17 is a plan view of the retaining means for positioning the stationary buckets in proper position while their support is being cast; Fig. 18 is an edge view of the blade positioning means shown in Fig. 17; Fig. 19 is a sectional view on the line 19—19 of Fig. 20, a portion of the device being broken away; Fig. 20 is a plan view of the blade positioning means shown in Fig. 17 with the stationary turbine blades inserted therein; Fig. 21 is a sectional view of a sand mold containing the stationary turbine blades with their positioning means and after the support for these blades has been cast; and Fig. 22 is a view of a portion of the stationary blades of a turbine with their support after the support has been cast in accordance with my invention.

Similar reference characters refer to similar parts in the different figures.

Referring to the accompanying drawings, Figs. 1 to 9 illustrate one form of the invention for use in casting a turbine wheel having a single row of blades attached to its periphery; Figs. 10 to 14 illustrate another form of the invention for use in casting a turbine wheel having two rows of blades attached to its periphery; and Figs. 15 to 22 inclusive illustrate another form of the invention for use in casting the support for the stationary blades of a turbine.

In casting a turbine wheel with a single row of blades according to my present invention, a sand mold formed in a two part flask of the usual construction is used, the matrix being first made from a pattern 1, represented in sectional view in Fig. 2 and comprising a central hub 2, a web 3, and a rim 4. Outside the rim 4 and attached thereto is an annular ring 5 rectangular in cross section and forming in the matrix a space to receive the positioning rings by which the blades of the turbine wheel are supported. The matrix is made in the sand in the usual manner with the pattern shown in Fig. 2, and after the removal of the pattern, the positioning rings and peripheral blades of the wheel are inserted in the annular space formed by the ring 5. The positioning rings 6 and 7 are shown in sectional view in Fig. 4. Between the positioning rings 6 and 7 is a spacing ring 8, the rings 6, 7 and 8 being united by screws 9. The rings 6 and 7 overhang the inner edge of the spacing ring 8 and are provided on their opposing surfaces with notches 10 placed opposite each other and adapted to receive the edges 11 of curved blades 12, shown in detached perspective view in Fig. 5. The ends of the blades 12 which project beyond the inner edges of the rings 6 and 7 are provided on opposite sides with notches 13 and 14, the notched ends of the blades projecting beyond the inner edges of the rings 6 and 7 into the space in the mold formed by the rim 4 of the pattern. The spaces between the inner edges of the rings 6 and 7 and between the outer ends of the blades 12 are filled with compacted sand 15, Fig. 7, to prevent the molten metal, from which the wheel is cast, from filling these spaces. The positioning rings, with the several blades 12 placed in position and the spaces between them filled with compacted sand as shown in Fig. 7, are then inserted in the matrix in the annular space formed by the ring 5, the positioning rings and blades being shown in the matrix in Fig. 8. The matrix is then filled with molten metal forming a central hub 16 and web 17 and a rim 18 in which the notched ends of the blades 12 are embedded. The body of the wheel contracts as it cools so that its periphery is drawn toward the center of the wheel. It is desirable that the blades be free to follow this motion of the periphery of the wheel or the cooling metal is liable to rupture before it becomes set. The positioning rings 6 and 7 are, therefore, separated by the spacing ring 8 so that the blades 12 will slide freely in the notches 10. The flask is then opened and the positioning rings 6 and 7 removed from the blades 12 by withdrawing the screws 9, leaving the hub 16, web 17, and rim 18 with the blades projecting from its periphery, as shown in Fig. 9.

In the construction of a turbine having two rows of blades, a pattern is employed, as shown in sectional view in Fig. 10, having a central hub 19, web 20, and a rim 21, and outside the rim 21 is the annular rim 22. The construction of the pattern for a turbine wheel having two rows of blades is substantially like that for one having a single row of blades, except that the rim 21 and ring 22 are increased in thickness in order to receive the two rows of blades. The matrix is formed from the pattern shown in Fig. 10, the ring 22 forming an annular space to receive the positioning rings by which the blades are supported.

The positioning rings shown in sectional view in Fig. 11 consist of the annular rings 23 and 24. Between the rings 23 and 24 are placed rings 25 and 26 spaced from the rings 23 and 24 by the spacing rings 27 and 28. Between the rings 25 and 26 is an intermediate spacing ring 29, the assemblage of rings 23 to 29 being held together by screws 30. The rings upon opposite sides of the spacing rings 27 and 28 overhang the inner edges of the spacing rings and are provided with notches 31 to receive the edges of the blades 12 which are thus arranged in two rows, as shown in Fig. 13. The assembled blades and positioning rings, as shown in Fig. 13, are then inserted in the matrix in the space formed by the rings 22 and the remainder of the matrix is filled with molten metal forming a hub 32, web 33, and rim 34, in which the notched ends of the double row of blades 12 are embedded, as shown in Fig. 14. It is desirable in this case also that the separation of the positioning rings be such as to allow the blades to slide freely in the notches 31 so that they may follow the periphery of the wheel as the metal cools.

In order to remove the positioning rings from the double row of blades 12, the screws 30 are withdrawn and the outer rings 23 and 24 are removed as in the case of a turbine having a single row of blades, but the inner rings 25 and 26 together with their intermediate ring 29 are made in halves, being divided on the line 35 of Fig. 11. The intermediate ring 29 is then withdrawn laterally, allowing each of the rings 25 and 26 to be lifted in turn from the edges of the blades 12.

The support for the stationary blades is preferably cast in several sections, the number of sections corresponding to the number of steam nozzles which are to drive the turbine. This support is cast along the outer convex edges of the blade positioning plates as shown in Fig. 21 and, if cast in a complete integral ring, it is liable to crack because of the fact that its natural contraction, due to shrinkage while cooling, is prevented by the blade positioning plates. The matrix in the sand mold 36 for use in casting the support 37 for the stationary blades 38 is formed by a pattern 39. The stationary blades 38 are held in proper position in this matrix by a pair of arcuate plates 40 and 41 held apart by a spacer 42. The positioning plates 40 and 41 and the spacer 42 are clamped together by suitable screws 43. The inner faces of the positioning plates 40 and 41 are provided with oppositely disposed notches or grooves 44 to receive the stationary blades and hold them in proper position in the matrix. Inasmuch as the support for the stationary blades is not cast in a complete circle, the shrinkage of the support as it cools does not have the same tendency to move the blades in their supporting notches that the shrinkage of the turbine wheel has and, therefore, it is not so important that the blades fit loosely in these notches. After the stationary blades 38 have been inserted between the positioning plates 40 and 41 as shown in Fig. 20, they are placed in the matrix in the position shown in Fig. 21, the width of the positioning plates being such as to leave a suitable mold cavity along their outer convex edges, the notched ends of the stationary blades extending into this cavity as shown in Fig. 21. The spaces between the convex edges of the positioning plates 40 and 41 and the inserted ends of the blades are filled with sand in the manner indicated in Fig. 7. Molten metal is then poured into the cavity so as to surround the notched ends of the blades and form the support 37.

In casting a turbine in accordance with the present invention, each blade is held accurately in position by means of positioning rings or plates which are in turn accurately positioned by the walls of the matrix, the blades being free, however, to follow the casting as it contracts while cooling.

While I have shown and described the details of several forms of my invention, I do not wish to be limited to such details as changes may be made without departing from the spirit of the invention; but Having described my invention, what I claim as new and desire to secure by Letters Patent is:

1. In a device for use in casting turbines, means for holding turbine blades in position in a molding flask while the metal is being poured, said means engaging the blades loosely to permit them to move freely as the metal contracts in cooling.

2. In a device for use in casting turbines, a pair of oppositely disposed plates for holding turbine blades in position in a molding flask while the metal is being poured, said plates being arranged to engage the blades loosely to permit the blades to move freely as the metal contracts in cooling.

3. In a device for use in casting turbines, a plurality of rings for engaging the blades for a wheel to hold them in position in a molding flask while the body of the wheel is being poured, said rings being arranged to engage the blades loosely to permit the blades to move freely as the metal contracts in cooling.

4. In a device for use in casting turbines, a plurality of rings for engaging the blades for a wheel to hold them in position in a molding flask while the body of the wheel is being poured, said rings being arranged to engage the blades loosely to permit the blades to move freely as the metal contracts in cooling.

5. In a device for use in casting turbines, two pairs of axially alined rings, the adjacent faces of the two rings of each pair being grooved approximately radially to receive the blades for a wheel and hold them in position in a molding flask while the body of the wheel is being cast, and a spacing ring interposed between said pairs of blade positioning rings, the spacing ring and the adjacent blade positioning ring of each pair being split.

6. In a device for use in casting turbines, two pairs of axially alined rings, the adjacent faces of the two rings of each pair being grooved approximately radially to receive the blades for a wheel and hold them in position in a molding flask while the body of the wheel is being cast, and removable means interposed between said pairs of blade positioning rings, the inner blade positioning ring of each pair being split.

7. In a device for use in casting turbines, two pairs of rings for engaging the blades for a wheel to hold them in position in a molding flask while the body of the wheel is being poured, spacing rings between the two blade positioning rings of each pair, and removable spacing means interposed between said pairs of blade positioning rings, the inner blade positioning ring of each pair being split.

Dated this fifteenth day of October, 1913.

FRANS H. C. COPPUS.

Witnesses:
PENELOPE COMBERBACH,
NELLIE WHALEN.